United States Patent [19]

Blum et al.

[11] Patent Number: 4,981,921

[45] Date of Patent: Jan. 1, 1991

[54] WATER-DILUTABLE BINDERS, A PROCESS FOR THEIR PRODUCTION AND THEIR USE

[75] Inventors: Harald Blum, Wachtendonk; Peter Höhlein, Kempen; Wolfhart Wieczorrek, Cologne, all of Fed. Rep. of Germany

[73] Assignee: Bayer Aktiengesellschaft, Leverkusen-Bayerwerk, Fed. Rep. of Germany

[21] Appl. No.: 292,453

[22] Filed: Dec. 30, 1988

[30] Foreign Application Priority Data

Jan. 9, 1988 [DE] Fed. Rep. of Germany ....... 3800389

[51] Int. Cl.$^5$ ............................................. C08L 33/12
[52] U.S. Cl. ................................... 525/419; 525/424; 525/428; 525/429; 525/386; 524/599
[58] Field of Search ............... 525/386, 419, 428, 429, 525/424; 524/599

[56] References Cited

U.S. PATENT DOCUMENTS

| | | | |
|---|---|---|---|
| 4,082,816 | 4/1978 | Fisk et al. | 525/419 |
| 4,368,320 | 1/1983 | Aldinger et al. | 528/355 |
| 4,504,635 | 3/1985 | Weber et al. | 525/450 |

FOREIGN PATENT DOCUMENTS 0108373 5/1984 European Pat. Off. .

*Primary Examiner*—John C. Bleutge
*Assistant Examiner*—R. Dean, Jr.
*Attorney, Agent, or Firm*—Connolly and Hutz

[57] ABSTRACT

Water-dilutable binders for water-dilutable lacquers, coating compositions or sealing compounds consist essentially of a mixture of 5 to 40 parts by weight of a crosslinker resin and 60 to 95 parts by weight of a copolymer containing carboxyl groups or acid anhydride groups or both and further containing hydroxyl groups, and wherein the carboxyl or acid anhydride groups have been at least partially converted into carboxylate groups to the degree necessary to provide solubility or dispersibility of the binder in water and said copolymer is obtained by copolymerizing an alpha, beta-unsaturated carboxylic acid, a hydroxyalkyl acrylate or methacrylate, an olefinic monomer, a hydroxy-free acrylate or methacrylate and, optionally other mono-or polyunsaturated monomer, and wherein at least 30% of the hydroxyl groups of the copolymer are modified by esterification with a lactone.

7 Claims, No Drawings

WATER-DILUTABLE BINDERS, A PROCESS FOR THEIR PRODUCTION AND THEIR USE

This invention relates to new water-dilutable binders based on (a) copolymers containing hydroxyl groups and at least partially neutralized carboxyl groups and b) cross-linker resins, to a process for their production and to their use in coating compositions or sealing compounds.

BACKGROUND OF THE INVENTION

Copolymers of acrylic and vinyl monomers in organic solvents are distinguished by a number of outstanding properties, including for example resistance to hydrolysis and stability in storage, minimal yellowing, high weather resistance and good gloss retention. The solvents used can seriously affect the economy of the binder systems produced from the binders, because the solvents are not incorporated in the coatings during the stoving process, but instead have to be additionally eliminated, for example by subsequent burning, to reduce environmental pollution as far as possible.

It is known (cf. for example G. Y. Talak, S. P. Pontis, Paint & Resin 12/83, pages 34 et seq., DE-OS No. 3 209 421, EP-A No. 95 263 or EP-A No. 105 293) that it is possible to use copolymer-based water-dilutable binders which generally contain emulsifiers to stabilize the aqueous binders or relatively large amounts of organic auxiliary solvents. The emulsifiers can adversely affect the lacquer properties of the coatings, for example resistance to water and detergents, weather resistance and/or gloss.

The use of relatively large quantities of organic solvents in water-dilutable binders generally originates from the production process because it provides for a stirrable viscosity and for controlled heat exchange during the polymerization or polycondensation reaction and the lacquers thus produced show a more favorable property level of the corresponding coatings in regard to levelling, crater formation and gloss.

EP-A No. 0 218 906 describes water-dilutable copolymers which do not contain any emulsifiers and which may be processed in combination with cross-linker resins to form lacquers containing less than 5% organic solvents. The lacquers and the films obtained from them are distinguished by a balanced overall property level.

For various applications, such as for example clearcoat binders, it is desirable to improve both the elasticity values and also safety of application for relatively high layer thicknesses under adverse conditions, including for example short airing times, high air humidity, low temperatures.

BRIEF DESCRIPTION OF THE INVENTION

It has now been found that water-dilutable binders of the type largely corresponding to EP-A No. 0 218 906 can be improved quite considerably in regard to the properties just mentioned and particularly in regard to safety of application in relatively thick layers, providing the hydroxyl groups present in the copolymers are at least partially modified with lactones by ring-opening ester formation between the hydroxyl groups and the lactones before, during or after the production of the copolymers.

Although the modification of copolymers containing hydroxyl groups with lactones, particularly ε-caprolactone, is already known from DE-OS No. 3 027 776, from U.S. Pat. No. 4,082,816 and from EP-A No. 0 151 495, these prior publications relate to solvent-containing coating compositions without any reference to water-dilutable binders or to the problem of building up relatively thick layers created in particular by water-dilutable coating compositions, so that no incentive to solve the problem on which the present invention is based can be derived from these prior publications.

Thus, the present invention relates to water-dilutable binders for water-dilutable lacquers, coating compositions or sealing compounds, particularly in aqueous clear and surface lacquers. The inventive binders are a mixture of 5 to 40 parts by weight of a crosslinker resin and 60 to 95 parts by weight of a copolymer containing carboxyl groups or acid anhydride groups or both and further containing hydroxyl groups, and wherein the carboxyl or acid anhydride groups have been at least partially converted into carboxylate groups to the degree necessary to provide solubility or dispersibility of the binder in water and said copolymer is obtained by copolymerizing an alpha, beta-unsaturated carboxylic acid, a hydroxyalkyl acrylate or methacrylate, an olefinic monomer, a hydroxy-free acrylate or methacrylate and, optionally other mono- or polyunsaturated monomer, and wherein at least 30% of the hydroxyl groups of the copolymer are modified by esterification with a lactone.

DETAILED DESCRIPTION

The present invention relates to water-dilutable binders consisting essentially of a mixture of (a) 60 to 95 parts by weight of a copolymer containing carboxyl groups and/or acid anhydride groups and also hydroxyl groups, of which the carboxyl or acid anhydride groups have been at least partially converted into carboxylate groups to guarantee the solubility or dispersibility of the binder in water and which has been obtained by copolymerization of (a1) 4 to 25 parts by weight of an $\alpha,\beta$-unsaturated carboxylic acid component consisting of at least one compound selected from the group consisting of methacrylic acid, acrylic acid, maleic acid, fumaric acid, itaconic acid and maleic anhydride, (a2) a total of 5 to 40 parts by weight of at least one hydroxyalkyl ester of methacrylic acid or acrylic acid containing 2 to 4 carbon atoms in the hydroxyalkyl radical, (a3) a total of 15 to 55 parts by weight of at least one olefinic monomer selected from the group consisting of (i) optionally alkyl- and/or chlorine-substituted vinyl or isopropenylbenzenes containing a total of 8 to 12 carbon atoms and (ii) alkyl methacrylates containing 1 to 4 carbon atoms in the alkyl radical, (a4) a total of 20 to 80 parts by weight of at least one olefinically unsaturated monomer selected from the group consisting of (i) acrylates free from hydroxyl groups and containing 1 to 18 carbon atoms in the alcohol component and (ii) methacrylates free from hydroxyl groups and containing 5 to 18 carbon atoms in the alcohol component, optionally using (a5) a total of up to 20 parts by weight of other mono- or polyunsaturated monomers, and (b) 5 to 40 parts by weight of a crosslinker resin, characterized in that at least 30% of the hydroxyl groups in copolymer (a) are present in lactone-modified form.

The present invention also relates to a process for the production of these binders (a) by copolymerization of the monomers mentioned under (a1) to (a5), at least partial conversion of the carboxylic acid and/or carboxylic anhydride groups present in the copolymers into carboxylate groups to guarantee the solubility or dispersibility of the binders in water and mixing of the copolymer thus obtained with (b) 5 to 40 parts by weight of a crosslinker resin and optionally with (c) auxiliaries and additives known from lacquer technology, characterized in that at least 30% of the hydroxyl groups in the copolymers (a) are modified with lactones by ring-opening ester formation before, during or after the copolymerization reaction.

The present invention also relates to the use of these binders for water-dilutable lacquers, coating compositions or sealing compounds, particularly in aqueous clear and surface lacquers.

The copolymers (a) are prepared by copolymerization of monomers (a1) to (a4), optionally using the monomers (a5), in the quantities shown above.

The monomers (a1) are preferably methacrylic acid, acrylic acid, maleic acid and/or maleic anhydride. Mixtures of these monomers may also be used. Component (a1) is preferably used in a quantity of 7 to 16 parts by weight.

Component (a2) is preferably hydroxyethyl acrylate, hydroxyethyl methacrylate, 2- and 3-hydroxypropyl acrylate or methacrylate, 2-, 3- or 4-hydroxybutyl acrylate or methacrylate or mixtures of these monomers. Component (a2) is preferably used in a quantity of 10 to 30 parts by weight.

Component (a3) is an aromatic vinyl or isopropenyl compound, such as styrene, α-methyl styrene, vinyl toluene, p-chlorostyrene, styrenes nucleus substituted by $C_1$–$C_4$ alkyl, or alkyl methacrylates containing 1 to 4 carbon atoms in the alkyl radical, such as methyl methacrylate, ethyl methacrylate, the isomeric propyl methacrylates or the isomeric butyl methacrylates, or mixtures of these unsaturated compounds. Component (a3) preferably consists of styrene, methyl methacrylate, ethyl methacrylate, n-butyl methacrylate or of mixtures of such compounds. Component (a3) is preferably used in a quantity of 20 to 50 parts by weight.

Component (a4) is a compound such as, for example, methyl acrylate, ethyl acrylate, propyl acrylate, isopropyl acrylate, butyl acrylate, isobutyl acrylate, tert.-butyl acrylate, pentyl (meth)acrylate, hexyl (meth)acrylate, 2-ethyl hexyl (meth)acrylate, octyl (meth)acrylate, lauryl (meth)acrylate, stearyl (meth)acrylate, benzyl acrylate or 2-phenyl ethyl acrylate. Component (a4) is preferably used in quantities of 25 to 60 parts by weight.

Component (a5), which is optional, is for example (i) an α,β-unsaturated copolymerizable compound, such as for example vinyl triethoxysilane, vinyl trimethoxysilane, vinyl triacetoxysilane, acrylonitrile, methacrylonitrile, N-methylol (meth)acrylamide, N-methoxymethyl (meth)acrylamide, N-vinyl pyrrolidone, or a mixture of such compounds, or (ii) a copolymerizable polyunsaturated compound such as, for example, hexane-1,6-diol-bis-acrylate, trimethylolpropane-bis-acrylate, trimethylolpropane-tris-acrylate, pentaerythritol trisacrylate, divinylbenzene, a reaction product of at least difunctional isocyanates with equivalent quantities of hydroxyalkyl (meth)acrylates, oligomeric butadiene homopolymers and copolymers, of the type described for example in DE-AS No. 1 186 831, in U.S. Pat. No. 3,789,040 or in "Makromoleküle" by H. G. Elias, 4th Edition, Hüthig and Wepf-Verlag, Basel, Heidelberg, New York, pages 676, 744 to 746, 1012 et seq., the butadiene homopolymers and copolymers normally having a number average molecular weight of 500 to 3000, a Wijs iodine value of 300 to 500 g iodine/g substance, optionally containing up to 50%, based on mixture, of other comonomers, such as for example those mentioned by way of example above, and optionally bearing functional groups such as, for example, hydroxyl and carboxyl groups.

Component (a5) is used in a quantity of, in all, up to 20 parts by weight and preferably up to 10 parts by weight, the polyunsaturated compounds mentioned by way of example under (ii) generally being used at most in a quantity of up to 3 parts by weight and more especially up to 2 parts by weight.

The copolymers are prepared by radically initiated copolymerization of the monomer mixtures selected in organic solution. The proportion of organic solvents is either gauged from the outset in such a way that a lacquer prepared using the copolymer contains $\leq 10\%$, preferably $\leq 5\%$ and more preferably $\leq 2.5\%$ solvent or, alternatively, part of the solvent used is distilled off from the resin melt to obtain the low solvent content mentioned in the final lacquer.

Suitable solvents for the copolymerization are alcohols, such as for example n-butanol, n-pentanol, isopentanol, n-hexanol, cyclohexanol, heptanol, methyl glycol, ethyl glycol, butyl glycol, methoxypropanol, ethoxypropanol, butoxypropanol, methyl diglycol, ethyl diglycol, butyl diglycol, glycolic acid methyl ester, glycolic acid ethyl ester, glycol acid butyl ester, lactic acid methyl ester, lactic acid ethyl ester, lactic acid butyl esters and mixtures of these and other alcohols and also ethers, such as for example dimethyl diglycol, dimethyl propylene glycol, other solvents, such as for example N-methyl pyrrolidone, solvent naphtha, ethyl carbonate, butyl acetate, xylene, toluene, cyclohexane, diacetone alcohol, methyl isobutyl ketone, acetone and also mixtures of the solvents mentioned.

The choice of the suitable solvent(s) depends on how the modification step with lactone is carried out, which will be discussed in more detail hereinafter.

Suitable initiators are organic peroxides, such as dibenzoyl peroxide, di-tert.-butyl peroxide, tert.-butyl peroxy-2-ethyl hexanoate, didecanoyl peroxide, and azo compounds, such as azodiisobutyronitrile, in quantities of 0.3 to 10% by weight.

To obtain the desired molecular weight, regulators, such as n-dodecyl mercaptan or mercaptoethanol, may be used in quantities of from 0.01 to 6%.

The copolymers according to the invention generally have average molecular weights of 5000 to 100,000 which may be determined, for example, by gel permeation chromatography on calibrated styragels.

The copolymerization is generally carried out at a temperature of 80° to 180° C.

The copolymerization is preferably carried out in at least 60% solution, the solvent and, optionally, part of the monomer mixture generally being introduced first and heated to the desired reaction temperature. The remaining monomer mixture and the initiator are continuously pumped in over a period of 3 to 6 hours. On completion of polymerization, part of the solvent is optionally distilled off an may be reused, for example, for further polymerization reactions.

The distillation is preferably carried out under a pressure of 0.1 to 0.01 bar at a vessel temperature of 60° to 120° C. It may even be carried out at normal pressure. In addition, the solvent may be driven out by the introduction of a vigorous stream of inert gas (for example $N_2$, $CO_2$).

Now, the essential point of the invention is that at least 30% and preferably 60 to 100% of the hydroxyl groups in the copolymers are modified with lactones by an esterification reaction which opens the lactone ring. This modification is understood to include both the addition of 1 lactone molecule onto 1 hydroxyl group and also the addition of several lactone molecules onto 1 hydroxyl group with formation of oligoester units corresponding to the particular lactone, terminal hydroxyl groups being present again in every case in the form of hydroxyalkyl ester groups corresponding to the particular lactone. In general, the lactone component is used in such a quantity for the modification that, for every unmodified hydroxyl group, there are up to 20 lactone molecules, preferably up to 5 lactone molecules and more preferably up to 1 lactone molecule.

Suitable lactones are, for example, those containing 3 to 15 carbon atoms in the ring; the rings may also contain various substituents. Preferred lactones are $\gamma$-butyrolactone, $\delta$-valerolactone, $\epsilon$-caprolactone, $\beta$-hydroxy-$\beta$-methyl-$\delta$-valerolactone, $\lambda$-lauric lactone or mixtures thereof. $\epsilon$-Caprolactone and $\gamma$-butyrolactone are particularly preferred.

The modification of the hydroxyl groups with the lactone component may be carried out before, during or after the copolymerization reaction.

In a first embodiment, therefore, the lactone modification comprises directly reacting the hydroxyfunctional monomers (a2) with the lactone component at temperatures of 100° to 160° C., optionally in the presence of suitable catalysts, for example based on tin, such as for example dibutyltin oxide, dibutyltin dilaurate, air being passed through the reaction mixture. Small quantities of polymerization inhibitors, such as hydroquinone monomethyl ether and similarly acting compounds, may optionally be added. In accordance with the foregoing observations, the reaction is preferably carried out in such a quantitative ratio that at least 30% of the hydroxyfunctional monomers subsequently copolymerized are modified with at least 1 lactone molecule or even with several lactone molecules. The hydroxyfunctional monomers thus modified are then copolymerized with the other monomers, optionally in combination with non-modified, hydroxyfunctional monomers (a2).

If the modification reaction is carried out in this way, the choice of the solvent for the copolymerization is not critical and any of the solvents mentioned by way of example above may be used.

In a second embodiment, the modification with lactone comprises either initially co-introducing the lactone component as solvent in the copolymerization reaction or pumping it into the reaction vessel together with the monomer mixture. Depending on the polymerization temperature, the polymerization is accompanied by a more or less rapid reaction between lactone and hydroxyfunctional monomer or copolymers formed.

The lower the reaction temperature, the more the lactone is initially of solvent character so that, to complete the reaction, the reaction mixture has to be heated towards the end of or after the polymerization reaction to a sufficiently high temperature to guarantee complete incorporation of the lactone. This method of conducting the reaction makes it possible, for example, to minimize the proportion of solvent because, at low polymerization temperatures, the lactone is incorporated relatively slowly and, hence, supports the dissipation of the heat of polymerization and improves the stirrability of the reaction mixture. On completion of the polymerization, most of the heat of reaction has been dissipated and the temperature may be increased or a suitable catalyst added in order completely to incorporate the lactone. Accordingly, this reaction can be controlled even at high viscosities.

Another embodiment of the modification with lactone comprises adding the lactone to the reaction mixture on completion of polymerization, i.e. reacting the polymer with the lactone to form a lactone-modified copolymer.

In the last two embodiments mentioned, it is of advantage initially not to use any hydroxyfunctional solvent, because otherwise the solvent and the modifying reagent may react with one another.

In the last two embodiments of the modification reaction with lactone, it is also possible in principle for carboxyl-containing monomer or carboxyl groups of the polymer to react partially with the modifying reagent. A certain proportion of such secondary products has no adverse effect on the products according to the invention.

After their preparation, the lactone-modified copolymers are brought into a water-soluble or water-dispersible form by addition of a suitable neutralizing agent. To this end, the neutralizing agent and, optionally, the water may be simultaneously added dropwise in portions with stirring to the hot resin melt or the resin melt is poured into an aqueous solution of the neutralizing agent heated to around 80° C., followed by stirring for 1 to 2 hours at 70° C.

Organic amines and water-soluble inorganic bases, for example sodium and potassium hydroxide or ammonia, may be used for neutralization.

It is preferred to use organic amines, such as triethylamine, diethanolamine, triethanolamine, methyl diethanolamine, diethyl ethanolamine, dimethyl ethanolamine, butanolamine, dibutanolamine, morpholine and ammonia and also mixtures of these neutralizing agents, optionally with other, even relatively high molecular weight amines containing ether or ester groups. At least 20% of the neutralizable carboxyl groups and preferably 25 to 90% are neutralized by salt formation in the aqueous copolymer dispersion after the neutralization step.

The pH value of the aqueous resin form is preferably in the range from 6.0 to 9.5. Depending on the degree of neutralization and the molecular weight, the aqueous copolymers thus prepared have solids contents of 30 to 50% for pumpable viscosities. The content of carboxylate groups in the copolymers dissolved or dispersed in water is generally between 50 and 300 milliequivalents per 100 g solids.

The copolymer resins are partly dissolved and partly dispersed, depending on the quantity of neutralizing agent added and the residual quantity of solvent. The dissolved components increase with increasing degree of neutralization and with increased co-solvent contents. The dispersion may change via a colloidal solution into a clear resin solution. By combination with crosslinker resins and after addition of pigments and other auxiliaries and additives commonly used in the lacquer industry, it is possible to obtain from the copolymers lacquers of low organic solvent content which show very high stability in storage even without dispersion aids or surface-active substances.

To prepare ready-to-use binders, the lactone-modified water-soluble or water-dispersible copolymer resins are combined with suitable crosslinker resins (b). The ready-to-use binders generally contain 60 to 95 parts by weight of the copolymers (a) and 5 to 40 parts by weight of the crosslinker resin (b).

Suitable crosslinker resins are, for example, amide- and amine-formaldehyde resins, phenolic resins, aldehyde and ketone resins, such as for example phenol-formaldehyde resins, resols, furan resins, urea resins, carbamic acid ester resins, triazine resins, melamine resins, benzoguanamine resins, cyanamide resins, aniline resins, of the type described in "Lackkunstharze", H. Wagner, H.F. Sarx, Carl Hanser Verlag München, 1971.

Other suitable crosslinker resins are blocked polyisocyanates, for example based on isophorone diisocyanate, hexamethylene diisocyanate, 1,4-diisocyanatocyclohexane, bis-(4-isocyanatocyclohexyl)-methane, 1,3-diisocyanatobenzene, 1,4-diisocyanatobenzene, 2,4-diisocyanato-1-methylbenzene, 1,3-diisocyanato-2-methylbenzene, 1,3-bis-isocyanatomethylbenzene, 2,4-bis-isocyanatomethyl-1,5-dimethylbenzene, bis-(4-isocyanatophenyl)-propane, tris-(4-isocyanatophenyl)-methane, trimethyl-1,6-diisocyanatohexane, or based on lacquer-grade polyisocyanates, such as biuret polyisocyanates based on 1,6-diisocyanatohexane, isocyanurate polyisocyanates based on 1,6-diisocyanatohexane or urethane lacquer polyisocyanates based on 2,4- and/or 2,6-diisocyanatotoluene or isophorone diisocyanate on the one hand and low molecular weight polyhydroxyl compounds, such as trimethylolpropane, the isomeric propanediols or butanediols or mixtures of such polyhydroxyl compounds on the other hand. Suitable blocking agents for these polyisocyanates are, for example, monohydric alcohols, such as methanol, ethanol, butanol, hexanol, cyclohexanol, benzyl alcohol, oximes, such as acetoxime, methyl ethyl ketoxime, lactams, such as ε-caprolactam or phenols.

Preferred crosslinker resins are melamine and urea resins, particularly alkylated melamine formaldehyde resins containing 1 to 8 carbon atoms in the alkyl chain, such as for example butylated and/or methylated or methoxymethylated melamine resins.

The hydrophilic modification of the copolymer component (a) is generally sufficient also to guarantee the dispersibility of the crosslinker resins where they are not themselves water-soluble or water-dispersible substances.

The aqueous binders according to the invention consisting essentially of components (a) and (b) may be directly used as clear lacquers. The binders according to the invention are generally heat-crosslinkable systems which change into the crosslinked state at temperatures above 120° C. and preferably in the range from 120° to 180° C.

Standard lacquer auxiliaries and additives of the type mentioned by way of example in the following may be added to the binder combinations according to the invention of components (a) and (b) and, optionally, (c).

The lacquers prepared in this way using the binders according to the invention may contain standard pigments and fillers, which may be both organic and inorganic, in quantities of 30 to 180%, based on binder solids, for example titanium dioxides, iron oxides, lead oxides, zinc oxides, chromium oxides, cadmium sulfides, chromates, sulfates, silicates of calcium, magnesium, barium, strontium and aluminium, carbon black, talcum, graphite, manganese phosphate, zinc sulfide, azo dyes, phthalocyanine complexes, quinacridones, anthraquinones, thioindigo dyes and the like and also mixtures of these and other pigments.

Standard additives, such as antioxidants, levelling aids, foam inhibitors, UV absorbers, antisedimenting agents, etc., may also be used.

The lacquers ready for application normally have total solids contents of 30 to 65% and are distinguished by a low content, i.e. $\leq 10\%$, preferably $\leq 5\%$ and more preferably $\leq 2.5\%$, volatile organic substances.

The coating compositions containing the binders according to the invention show excellent stability in storage. Even after storage for 3 months at 40° C., there are no signs of degradation.

The binders according to the invention are particularly suitable for the production of clear lacquers and surface lacquers, but may also be used for the production of thicklayer coatings or of sealing compounds.

The systems according to the invention are particularly suitable for the coating of heat-resistant substrates, being applied thereto by any of the usual processes, including for example spray coating, dip coating, roll coating, spread coating or casting. Suitable substrates are optionally pretreated materials, such as metals, glass, wood, plastics, cardboard, ceramics or paper. The binders according to the invention are also suitable for the production of printing inks for textiles or for the production of impregnating or strengthening materials for paper or leather.

The stoving temperatures for the systems according to the invention are generally 120° to 180° C. for stoving times of 5 to 30 minutes. It has often proved favorable to air the coatings for 5 to 20 minutes before stoving.

The lacquers and the coatings produced from them are distinguished by a number of advantageous properties, including:
good dilutability with water;
problem-free processing and high safety of application, even under adverse conditions, such as for example high air humidity;
formation of high layer thicknesses;
good adhesion to various substrates;
extreme hardness coupled with high elasticity of the lacquer films.

In the following Examples, all percentages are percentages by weight.

COMPARISON EXAMPLE (EP-A No. 218,906)

320 g n-butanol are introduced into and heated to 125° C. in a 3-liter stirred tank equipped with an inert gas inlet, heating system, cooling system and two feed pipes. A mixture of 525 g n-butyl acrylate, 300 g ethyl acrylate, 195 g styrene, 150 g methyl methacrylate, 75 g hydroxyethyl acrylate, 75 g hydroxyethyl methacrylate, 180 g methacrylic acid and 30 g n-dodecylmercaptan is then pumped in continuously over a period of 4 hours. At the same time, 30 g tert-butylperoxy-2-ethyl hexanoate in 30 g n-butanol are added over a period of 5 hours. The polymerization mixture is then stirred for 3 hours at 125° C. and the n-butanol subsequently distilled off at normal pressure, distillation being forced by vigorous introduction of inert gas. The solids content of the resin melt after distillation comprises 91.7%.

A solution of 62.7 g dimethyl ethanolamine in 1897 g deionized water is added in portions with stirring to the resin melt cooled to around 80° C., followed after the addition by stirring for 2 hours.

EXAMPLE 1

410 g n-butoxyethanol are introduced into and heated to 128° C. in a 4-liter reaction vessel equipped with an inert gas inlet, a stirrer, a cooling system and a heating system. A mixture of 450 g methacrylic acid, 840 g methyl methacrylate, 850 g n-butyl acrylate, 200 g ethyl acrylate, 90 g styrene, 570 g of a reaction product of 330 g hydroxyethyl methacrylate and 240 g ε-caprolactone (prepared by heating the components for 3 hours to 140° C. in the presence of 0.1% tert.-butyl hydroquinone and 0.2% p-toluenesulfonic acid) and 6 g n-dodecylmercaptan is then introduced over a period of 4 hours. At the same time, 171 g of a 70% solution of tert.-butylperoxy-2-ethyl hexanoate in a hydrocarbon mixture is added over a period of 5 hours. The reaction mixture is then stirred for 2 hours at 128° C. The resin melt thus obtained has a solids content of 88.6%.

2820 g of this resin melt are stirred into a solution heated to 70° C. of 88.0 g dimethyl ethanolamine in 3000 g deionized water, followed by stirring for 2 hours at 70° C. and then filtration.

EXAMPLE 2

580 g diethylene glycol dimethyl ether are introduced into and heated to 132° C. in a 5-liter reaction vessel equipped with an inert gas inlet, a stirrer, a cooling system and a heating system. A mixture of 450 g methacrylic acid, 450 g 1,4-butanediol monoacrylate, 610 g methyl methacrylate, 90 g styrene and 1400 g n-butyl acrylate is then added over a period of 4 hours. At the same time, 171 g of a 70% solution of tert.-butylperoxy-2-ethyl hexanoate in a hydrocarbon mixture are introduced over a period of 5 hours. After stirring for 1 hour at 132° C., 400 g ε-caprolactone are added and the mixture stirred for another 3 hours. The resin melt thus obtained has a solids content of 85.7%.

2650 g of this resin melt are stirred into a solution heated to 70° C. of 82 g dimethyl ethanolamine in 2880 g deionized water. After 2 hours at 70° C., the mixture is filtered.

EXAMPLE 3

117 g diethylene glycol dimethyl ether, 93 g ε-caprolactone and 210 g of a monomer mixture of 190 g acrylic acid, 200 g styrene, 800 g n-butyl acrylate, 280 g 1,4-butanediol monoacrylate, 140 g 2-hydroxypropyl methacrylate, 390 g methyl methacrylate and 20 g mercaptoethanol are introduced into and heated to 115° C. in a 3-liter reaction vessel equipped with a stirrer, cooling system, heating system and inert gas inlet. The rest of the monomer mixture is then added over a period of 4 hours in admixture with 127 g ε-caprolactone. At the same time, 146 g of a 70% solution of tert.-butylperoxy-2-ethyl hexanoate in a hydrocarbon mixture are added over a period of 5 hours, followed by stirring for 3 hours at 135° to 140° C. The resin melt thus obtained has a solids content of 94.8%. A solution of 105 g methyl diethanolamine in 2581 g deionized water is added to 1934 g of this resin melt, followed by dispersion or dissolution for a few hours at 70° C.

The aqueous binder components obtained in accordance with the Comparison Example and the Examples according to the invention are mixed in a ratio by weight of 80:20 (based on solids) with a commercial melamine-formaldehyde resin in the form of a 90% solution in isobutanol ((R)Cymel 327, a product of the American Cyanamid Company), diluted to spraying viscosity and applied to degreased steel sheets. After airing for 15 minutes at room temperature, the films were stoved for 20 minutes at 140° C. and the following results were obtained:

|  | Comparison | Example 1 | Example 2 | Example 3 |
| --- | --- | --- | --- | --- |
| Fault-free film thickness | 0 | + | + | + |
| Hardness | 0 | + | + | + |
| Elasticity | + | + | + | + |
| Solvent resistance | 0 | + | + | + |

+: O.K.
0: still acceptable
—: not O.K.

Film thickness obtainable without faults:
<35 μm: —
>35 μm: 0
>60 μm: +

Hardness (König pendulum hardness in seconds):
<100 seconds: —
>100 seconds: 0
>140 seconds: +

Elasticity (Erichsen indentation in mm):
<3 mm: —
>3 mm: 0
>6 mm: +

Solvent resistance (number of double wipes with a methyl isobutyl ketone-impregnated cotton wool plug without any visible change in the film):
<100: —
>100: 0
>200: +

Comparable results can also be obtained with pigmented lacquers.

What is claimed is:

1. Water-dilutable binders consisting essentially of a mixture of
   (a) 60 to 95 parts by weight of a copolymer containing carboxyl groups or acid anhydride groups or both and further containing hydroxyl groups, and wherein the carboxyl or acid anhydride groups have been at least partially converted into carboxylate groups to the degree necessary to provide solubility or dispersibility of the binder in water and which has been obtained by copolymerization of
   (a1) 4 to 25 parts by weight of an unsaturated monomer which is at least one compound selected from the group consisting of methacrylic acid, acrylic acid, maleic acid, fumaric acid, itaconic acid and maleic anhydride,
   (a2) a total of 5 to 40 parts by weight of at least one hydroxyalkyl ester of methacrylic acid or acrylic acid containing 2 to 4 carbon atoms in the hydroxyalkyl moiety, (a3) a total of 15 to 55 parts by weight of at least one olefinic monomer comprising (i) or (ii) wherein
  (i) is vinyl benzene, vinyl benzene substituted by chloro or alkyl, isopropenylbenzene, or isopropenylbenzene substituted by chloro or alkyl, with the proviso that monomers (i) contain a total of 8 to 12 carbon atoms, and
  (ii) is alkyl methacrylate containing 1 to 4 carbons in the alkyl moiety,
(a4) a total of 20 to 80 parts by weight of at least one olefinically unsaturated monomer selected from the group consisting of (i) acrylates free from hydroxyl groups and containing 1 to 18 carbon atoms in addition to to acryl and (ii) methacrylates free from hydroxyl groups and containing 5 to 18 carbon atoms in addition to methacryl, and
(a5) 0 to 20 parts by weight of other mono- or polyunsaturated monomers
and
(b) 5 to 40 parts by weight of a crosslinker resin, characterized in that at least 30% of the hydroxyl groups in copolymer (a) are present in lactone-modified form.

2. A process for the production of the water-dilutable binder claimed in claim 1 which comprises copolymerizing monomers recited for (a1) to (a5), at least partially converting the carboxylic acid or carboxylic anhydride groups present in the copolymer into carboxylate groups to the degree necessary to provide solubility or dispersibility of the binders in water,
  and wherein at least 30% of the hydroxyl groups present in the copolymer or monomers are modified with lactones by ring-opening ester formation before, during or after the copolymerization, and then mixing the copolymer thus obtained with 5 to 40 parts by weight of a crosslinker resin.

3. A process as claimed in claim 2, wherein the copolymer is the copolymerized product of:
  (a1) a total of 7 to 16 parts by weight of methacrylic acid, acrylic acid, maleic acid, maleic anhydride, or mixtures thereof,
  (a2) a total of 10 to 30 parts by weight of hydroxyethyl acrylate, hydroxyethyl methacrylate, hydroxypropyl acrylate, hydroxypropyl methacrylate, hydroxybutyl acrylate hydroxybutyl methacrylate or mixtures thereof,
  (a3) a total of 20 to 50 parts by weight styrene, methyl methacrylate, ethyl methacrylate, butyl methacrylate or mixtures thereof,
  (a4) a total of 25 to 60 parts by weight methyl acrylate, ethyl acrylate, n-propyl acrylate, isopropyl acrylate, n-butyl acrylate, isobutyl acrylate, tert.-butyl acrylate, 2-pentyl (meth)acrylate, n-hexyl (meth)acrylate, 2-ethyl hexyl (meth)acrylate, n-octyl (meth)acrylate, n-lauryl (meth)acrylate, n-stearyl (meth)acrylate, benzyl acrylate, 2-phenyl ethyl acrylate or mixtures thereof, and
  (a5) up to 10 parts by weight of other mono- or polyolefinically unsaturated monomers.

4. A process as claimed in claim 2 wherein at least 60% of the hydroxyl groups present in the copolymers or monomers are modified with a lactone before, during or after the copolymerization.

5. A process as claimed in claim 4 wherein the lactone is ε-caprolactone.

6. In an improved water dilutable lacquer, coating composition or sealing compound which contain a binder, the improvement comprises said binder being a water-dilutable binder according to claim 1.

7. In an improved water dilutable clear lacquer or surface lacquer which contain a binder, the improvement comprises said binder being a water-dilutable binder according to claim 1.

* * * * *